United States Patent
Nawata

(10) Patent No.: US 6,941,108 B2
(45) Date of Patent: Sep. 6, 2005

(54) VSAT STATION AND VSAT COMMUNICATION SYSTEM

(75) Inventor: Hizuru Nawata, Tokyo (JP)

(73) Assignee: NEC Corporation (JP)

( * ) Notice: Subject to any disclaimer, the term of this patent is extended or adjusted under 35 U.S.C. 154(b) by 418 days.

(21) Appl. No.: 10/148,810

(22) PCT Filed: Dec. 4, 2000

(86) PCT No.: PCT/JP00/08576
§ 371 (c)(1),
(2), (4) Date: Jun. 5, 2002

(87) PCT Pub. No.: WO01/43312
PCT Pub. Date: Jun. 14, 2001

(65) Prior Publication Data
US 2002/0183058 A1 Dec. 5, 2002

(30) Foreign Application Priority Data
Dec. 7, 1999 (JP) .......................... 11/347366

(51) Int. Cl.[7] .............................................. H04B 7/185
(52) U.S. Cl. ...................... 455/12.1; 455/427; 455/13.2
(58) Field of Search .............................. 455/12.1, 13.2, 455/13.3, 15, 21, 427, 515; 370/79, 331; 709/235, 233

(56) References Cited
U.S. PATENT DOCUMENTS

| | | | | |
|---|---|---|---|---|
| 4,884,208 A | * | 11/1989 | Marinelli et al. | 701/300 |
| 5,490,134 A | * | 2/1996 | Fernandes et al. | 370/466 |
| 5,734,962 A | * | 3/1998 | Hladik et al. | 455/12.1 |
| 6,115,750 A | * | 9/2000 | Dillon et al. | 709/235 |
| 6,181,952 B1 | * | 1/2001 | Murata | 455/552.1 |
| 6,321,268 B1 | * | 11/2001 | Dillon et al. | 709/233 |
| 6,581,177 B1 | * | 6/2003 | Segal et al. | 714/751 |
| 6,693,903 B1 | * | 2/2004 | Shively | 370/370 |

FOREIGN PATENT DOCUMENTS

| | | |
|---|---|---|
| JP | 4-97628 | 3/1992 |
| JP | 4-256228 | 9/1992 |
| JP | 7-327022 | 12/1995 |
| JP | 9-270743 | 10/1997 |
| JP | 10-247871 | 9/1998 |
| JP | 11-234305 | 8/1999 |

* cited by examiner

Primary Examiner—Nick Corsaro
Assistant Examiner—Tan Trinh
(74) Attorney, Agent, or Firm—Dickstein, Shapiro, Morin & Oshinsky, LLP.

(57) ABSTRACT

A VSAT station and a VSAT communication system have a demand assign multiple access function for keeping a transmission path only for a required period of time to effectively use frequencies. The VSAT station has a transmission controller for temporarily reading and storing communication data 41 to be transmitted in buffer 42 and outputting the stored communication data as transmission data 43 after elapsed of a given period of time. Communication traffic monitoring circuit 45 monitors the stored amount of communication data in buffer 42 and outputs communication path selecting signal 46. Transmission data switching circuit 44 selects a transmission circuit to transmit the transmission data. If the communication traffic between communicating stations is increased, then dedicated line 49 is established in another frequency band. If CSC line 48 is congested, then dedicated line 49 is established to reduce the burden on CSC line 48. Thus, frequencies are effectively used and expenses for using the satellite repeater are reduced.

8 Claims, 3 Drawing Sheets

HOST VSAT STATION

HUB STATION

VSAT STATION AND VSAT COMMUNICATION SYSTEM

TECHNICAL FIELD

The present invention relates to a VSAT station and a VSAT communication system, and more particularly to a very small earth station or a small earth station for satellite communications which is referred to as VSAT (Very Small Aperture Terminal) and a VSAT communication system for performing satellite communications between such ground stations.

BACKGROUND ART

Heretofore, a VSAT communication system is constructed as a digital satellite communication system comprising a single central station (hereinafter referred to as "hub station"), a plurality of very small earth stations, and a satellite repeater.

When the hub station and a very small earth station or a plurality of very small earth stations perform DAMA (Demand Assign Multiple Access) communications in a SCPC (Single Channel Per Carrier) according to FDMA (Frequency Division Multiple Access) through the satellite repeater, a transmission path suitable for the communications is selected depending on the size of the traffic, and the communications are carried out using the selected transmission path.

A CSC (Common Signaling Channel) line according to prior art 1 is used only for control monitoring for DAMA, and usually a sufficient capacity for communications is available and an extra capacity is present for such a CSC line. The communication path may be narrowed or reduced in transmission rate in order to reduce the extra capacity. However, from the standpoint of realizing modulators and demodulators, too a narrow transmission path, i.e., a transmission path with too a low transmission rate, would result in a deteriorated line due to phase noise of a frequency converter or the like, failing to provide stable transmission. Therefore, a certain thick line, i.e., a line having a high transmission rate, is required.

Japanese publication of patent application No. 4-256228 discloses a transmission rate setting system as prior art 2 whose technical field is similar to the technical field of the present invention. According to the prior art 2, the traffic rate of transmissions and receptions through a line of a satellite communication system is monitored, and a transmission rate, a carrier frequency, and a carrier bandwidth are changed based on the monitored traffic rate.

In a satellite communication system disclosed in Japanese publication of patent application No. 9-270743 as prior art 3, efforts are made to use a satellite transponder as a line resource highly efficiently in satellite communications at very small earth stations (communication stations) which perform SCPC communications according to DAMA.

The extra capacity which is present in the above prior art means that a communication path is wasted, resulting in a poor economic efficiency.

In recent packet communications, it is customary not to transmit a large amount of data, but to transmit a small amount of data such as electronic mail data. Demands in the market are that a large amount of data to be transmitted occasionally such as for file transfer should be transmitted as quickly as possible in a short period of time. However, if a bandwidth is always kept for the occasional transmission of a large amount of data, then the problem of wasted frequencies is caused.

It is an object of the present invention to provide a VSAT station and a VSAT communication system which have a demand assign multiple access function according to frequency division multiple access function for keeping a transmission path only for a required period of time for effective use of frequencies.

DISCLOSURE OF THE INVENTION

To achieve the above object, a VSAT communication system according to one aspect of the invention is characterized by a transmission controller comprising a buffer for temporarily reading and storing communication data to be transmitted, and outputting the stored communication data as transmission data after elapse of a given period of time, a transmission data switching circuit for selecting a transmission circuit for the transmission data thus output from the buffer, and a communication traffic monitoring circuit for monitoring the stored amount of communication data in the buffer, and outputting a communication path selecting signal to select a transmission circuit depending on the stored amount of communication data to the transmission data switching circuit, thus providing a demand assign multiple access function for selecting a transmission circuit for the transmission data, wherein the transmission circuit selected for the transmission data is either a CSC line or a dedicated line for the transmission data, and each VSAT station performs demand assign multiple access and, at the same time, outputs a request for assuring a frequency band to establish a dedicated line to the hub station as the center of VSAT stations through the CSC line.

If the stored amount of transmission data which is being monitored reaches a predetermined amount, then a communication path selecting signal is output to the transmission data switching circuit to output the transmission data to the dedicated line.

Communications between the hub station and the VSAT stations may be communications performed through the satellite repeater. The VSAT communication system may further comprise routers connected respectively to the VSAT stations and also connected respective LANs.

BEST MODE FOR CARRYING OUT THE INVENTION

VSAT stations and VSAT communication systems according to embodiments of the present invention will be described in detail below with reference to the drawings. FIGS. 1 through 4 show a VSAT communication system according to an embodiment of the present invention.

Figure 1:
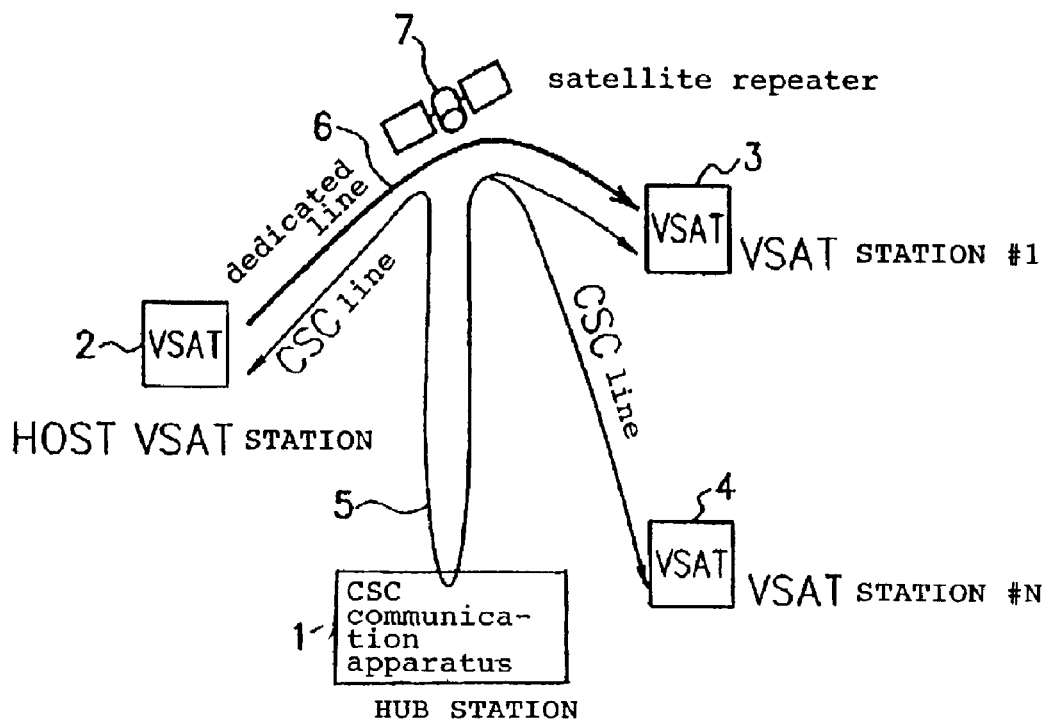
FIG. 1 is a diagram showing the concept of a VSAT communication system according to an embodiment of the present invention.

As shown in FIG. 1, the VSAT communication system comprises hub station 1, VSAT stations 2 through 4, CSC line 5, dedicated line 6, and satellite repeater 7. Hub station 1 is a central station having a CSC communication device. VSAT stations 2 through 4 include HOST VSAT station 2, VSAT station #1(3), and VSAT station #N(4).

Figure 2:
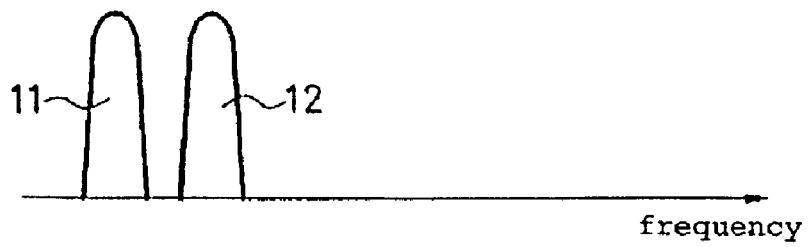
FIG. 2 is a diagram showing an example of operation of the VSAT communication system shown in FIG. 1.
Figure 3:
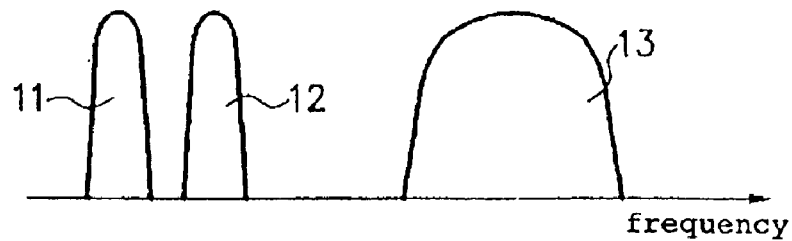
FIG. 3 is a diagram showing an example of operation of the VSAT communication system shown in FIG. 1.
Figure 4:
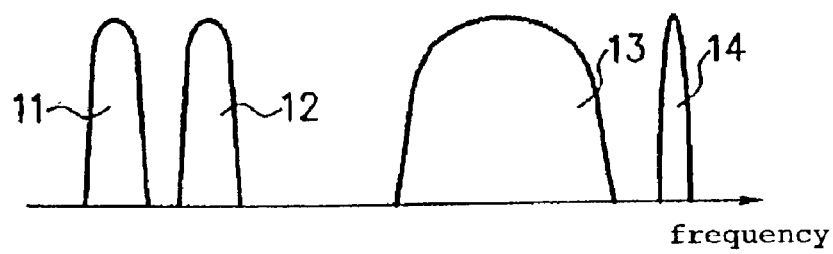
FIG. 4 is a diagram showing an example of operation of the VSAT communication system shown in FIG. 1.

FIGS. 2, 3, and 4 show examples of operation of the VSAT stations and the VSAT communication system shown in FIG. 1. FIGS. 2, 3, and 4 illustrate frequency bands 11, 12, 13, 14 for a downlink for the CSC line, an uplink for the CSC line, a dedicated line, and a dedicated line for a return link.

A communication event between VSAT station 2 as a host and VSAT station #1(3) will be considered below. When the communication traffic is small in a normal mode, the idle capacity of CSC line 5 is used to establish a bidirectional link and the communication event is performed through the bidirectional link. Because of the nature of the CSC line, the communication event takes place in a double-hop connection through hub station 1.

When the communication traffic is increased to the extent that the idle capacity of CSC line 5 is not enough to handle the communication event, then a frequency band is positively assigned to establish a dedicated line (see FIGS. 3 and 4). Such a dedicated line may be established only in the direction mainly to transmit the data, and a return link for acknowledging the transmission (ACK) is established using the idle capacity of CSC line 5 because the communication traffic of the return link is small.

When the CSC line is congested, a frequency band is also assigned to establish a dedicated line. At this time, a dedicated line may also be established for a return link to reduce the burden on the CSC line.

FIGS. 2, 3, and 4 show frequency bands on the satellite repeater. In FIGS. 2, 3, and 4, frequency band 11 is used by the downlink of the CSC line for transmitting information from hub station 1 to a VSAT station, and frequency band 12 is used by the uplink of the CSC line for transmitting information from a VSAT station to hub station 1. Normally, only these frequency bands are used to perform communications, as shown in FIG. 2, and remaining, frequency bands can be used for another purpose.

When the communication traffic between communication stations is increased, a dedicated line is established in another frequency band 13, as shown in FIG. 3. At this time, only one wave is assigned because the dedicated line may be established for a link in the direction to transmit the data.

When the CSC line is congested, as shown in FIG. 4, a frequency band 14 may be established as a dedicated line for a return link. The return link may have a small transmission capacity and may take up a small band as the communication traffic thereof is relatively small.

Figure 5:
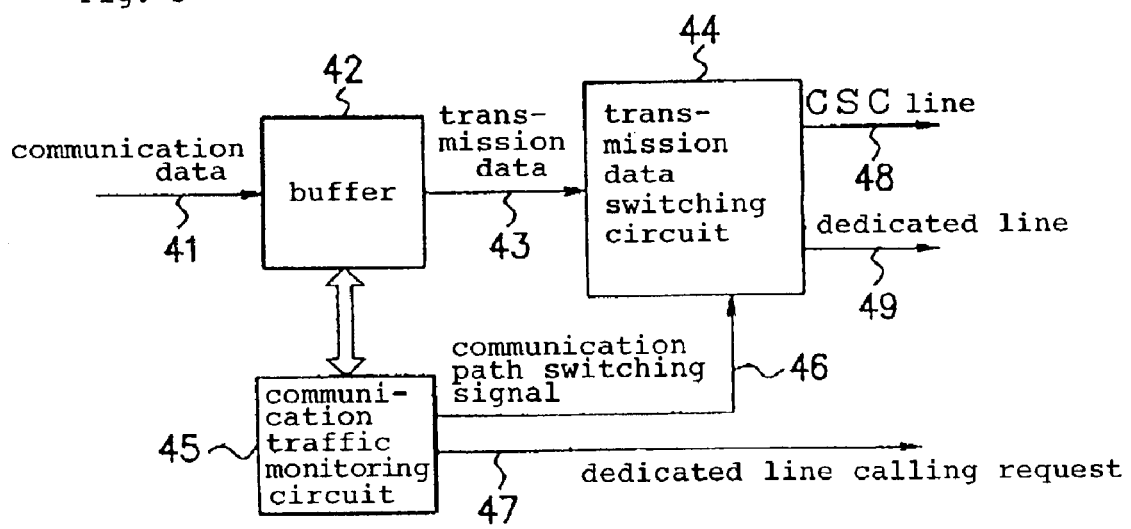
FIG. 5 is a block diagram of a transmission controller for use in a VSAT station according to the present invention.

FIG. 5 shows in block form a transmission controller for use in a VSAT station. The transmission controller comprises buffer 42, transmission data switching circuit 44, and communication traffic monitoring circuit 45. Input and output data and signals include communication data 41 input to buffer 42, transmission data 43 output from buffer 42 and input to transmission data switching circuit 44, communication path selecting signal 46 output from communication traffic monitoring circuit 45 and input to transmission data switching circuit 44, a signal of dedicated line calling request 47 output from communication traffic monitoring circuit 45, and signals output from transmission data switching circuit 44 through CSC line 48 and dedicated line 49.

Communication data 41 to be transmitted is temporarily read and stored in buffer 42. After a given period of time has elapsed from the temporary storage of communication data 41, communication data 41 is output as transmission data 43 from buffer 42, transmitted via transmission data switching circuit 44, and output to CSC line 48. During this time, communication traffic monitoring circuit 45 monitors the stored amount of communication data 41 in buffer 42. If the stored amount of communication data 41 in buffer 42 reaches a certain amount, communication traffic monitoring circuit 45 outputs communication path selecting signal 46 to transmission data switching circuit 44 to control same to output transmission data 43 to dedicated line 49. At the same time, communication traffic monitoring circuit 45 outputs a signal of dedicated line calling request 47 to hub station 1 to keep a frequency band via CSC line 48 to establish dedicated line 49. In this manner, a line is selected depending on the communication traffic.

1) If the communication traffic is small, then the following procedure is carried out:

The communications are carried out using the idle capacity of a common channel which is referred to as a common signaling channel (CSC) for controlling and monitoring all the VSAT stations, including the hub station, of the satellite communication system. The common channel is a channel for the plural VSAT channels to use one frequency in a time-division fashion for communications, and refers to a channel for performing communications such as a TDM channel, a TDMA channel, or a slotted Aloha channel.

In this case, communications between a VSAT station and another VSAT station are double-hop communications performed via the hub station. No new frequency band is required, and the communications are carried out using the idle capacity of the CSC line in both directions.

2) If the communication traffic is relatively large, then the following procedure is carried out:

A dedicated line is established for communications between VSAT stations. The communications are single-hop communications, and a new frequency band needs to be assigned for the communications. At this time, the dedicated line is established only in the direction to transmit the data, and the idle capacity of the CSC line is used for a return link. The communications are carried out in a so-called asymmetric mode. The transmission capacity of the dedicated line is determined depending on the communication traffic. If the communication traffic is large, the transmission rate is set to a higher rate, and if the communication traffic is small, the transmission rate is set to a lower rate, so that the data can be transmitted without delay.

3) If the CSC line is congested, then the following procedure is carried out:

If the CSC line is congested due to an increased in the number of communicating stations while communications are being carried out using the idle capacity of the CSC line in the case 1) above, then a dedicated line is established, lessening the burden on the CSC line, as with the case 2) above.

A dedicated line may be established for a return link opposite to the direction to transmit the data for the purpose of reducing the burden on the CSC line. By thus assigning a frequency band depending on the communication traffic, frequencies are effectively used and expenses for using the satellite repeater are reduced.

As described above, a frequency band is assigned at any time for a required period of time depending on the communication traffic. Consequently, frequencies are effectively used and expenses for using the satellite repeater 7 are reduced. Effective use of frequencies is achieved by maintaining a transmission path for a required period of time.

(Another Embodiment)

Figure 6:
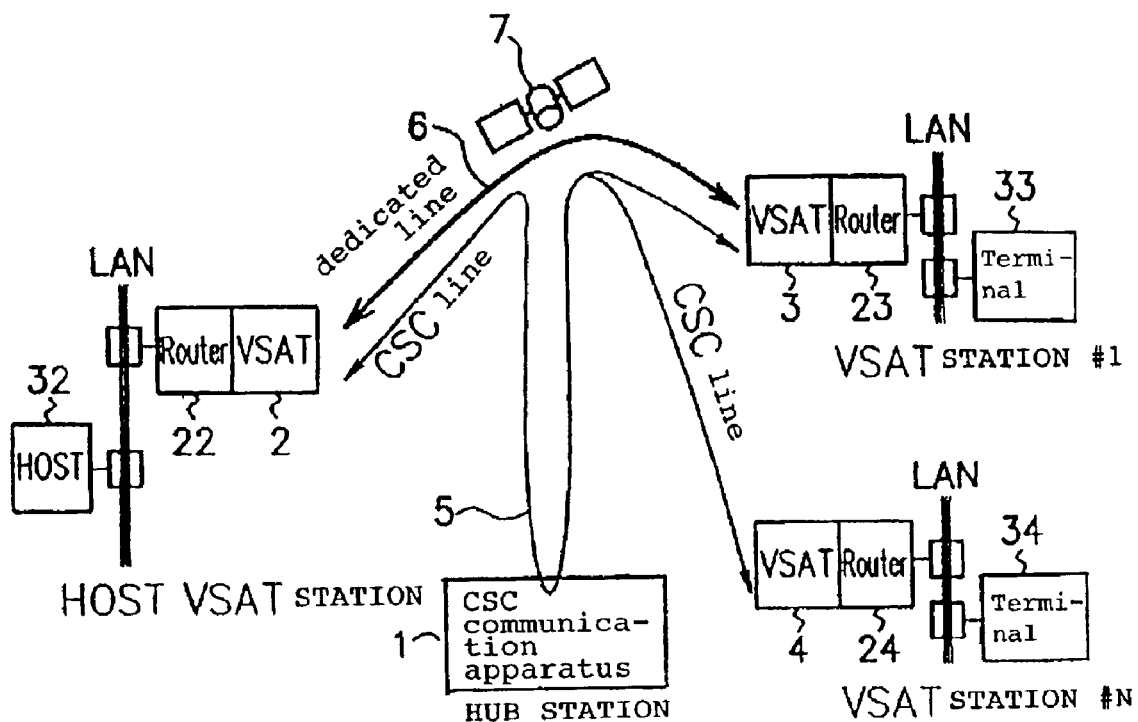
FIG. 6 is a diagram showing the concept of a VSAT communication system according to another embodiment of the present invention.

FIG. 6 shows a VSAT communication system according to another embodiment of the present invention. The embodiment shown in FIG. 6 represents a specific arrangement to which the present invention is applied. The VSAT communication system shown in FIG. 6 comprises a HOST VSAT station having HOST 32 and Router 22/VSAT2 and a plurality of VSAT stations #n (n ranges from 1 to N) each having a terminal and a Router/VSAT. Each of the HOST VSAT station and VSAT stations #n is connected to its own LAN. Specifically, the present invention offers advantages in the case where a router is connected to each VSAT station, and routers are connected to each other. If an excessive capacity is used as a communication channel and terminal communications are performed using the communication channel, then no communication path is wasted.

The above embodiments are illustrated as preferred embodiments by way of example. However, the present invention is not limited to the above embodiments, but the embodiments may be modified in various ways without departing from the scope of the present invention.

INDUSTRIAL APPLICABILITY

As is apparent from the above description, the VSAT station according to the present invention has a demand assign multiple access function to temporarily read and store communication data to be transmitted, output the stored communication data as transmission data after elapse of a given period of time, select a transmission circuit for the transmission data thus output, monitor the stored amount of communication data in the buffer, and control the transmission data switching circuit to select a transmission circuit depending on the stored amount of communication data.

If the CSC circuit in the VSAT communication system is congested, a dedicated line is established to lessen the burden on the CSC line. By assigning a frequency band depending on the communication traffic, frequencies are effectively used and expenses for using the satellite repeater are reduced. Since a frequency band is assigned only for a required period of time, frequencies are effectively used.

What is claimed is:

1. A VSAT communication system for performing mutual communications between a plurality of VSAT stations and a single hub station via a satellite repeater, characterized in that:

each of said VSAT stations comprises
a transmission controller having a buffer for temporarily reading and storing communication data to be transmitted, and outputting the stored communication data as transmission data after elapse of a given period of time,
a transmission data switching circuit for selecting a transmission circuit for the transmission data thus output from the buffer, and
a communication traffic monitoring circuit for monitoring the stored amount of communication data in said buffer, and outputting a communication path selecting signal to select a transmission circuit depending on the stored amount of communication data to said transmission data switching circuit, thus providing a demand assign multiple access function for selecting a transmission circuit for the transmission data; and said transmission circuit selected for the transmission data comprises either a CSG line or a dedicated line for a return link, and each of said VSAT stations outputs a dedicated line calling request for keeping a frequency band and establishing said dedicated line through said CSG line to the hub station which is a central one of said VSAT stations, at the same time that said demand assign multiple access function is performed.

2. A VSAT communication system according to claim 1, wherein said communication traffic monitoring circuit outputs a communication path selecting signal to said transmission data switching circuit to output the transmission data to said dedicated line if the stored amount of communication data which is being monitored reaches a predetermined amount.

3. A VSAT communication system according to claim 2, wherein communications between said hub station and said VSAT stations are communications performed through said satellite repeater.

4. A VSAT communication system according to claim 3, further comprising routers connected respectively to said VSAT stations and also connected to respective LANs.

5. A VSAT communication system according to claim 2, further comprising routers connected respectively to said VSAT stations and also connected to respective LANs.

6. A VSAT communication system according to claim 1, wherein communications between said hub station and said VSAT stations are communications performed through said satellite repeater.

7. A VSAT communication system according to claim 6, further comprising routers connected respectively to said VSAT stations and also connected to respective LANs.

8. A VSAT communication system according to claim 1, further comprising routers connected respectively to said VSAT stations and also connected to respective LANs.

* * * * *